Patented Oct. 17, 1939

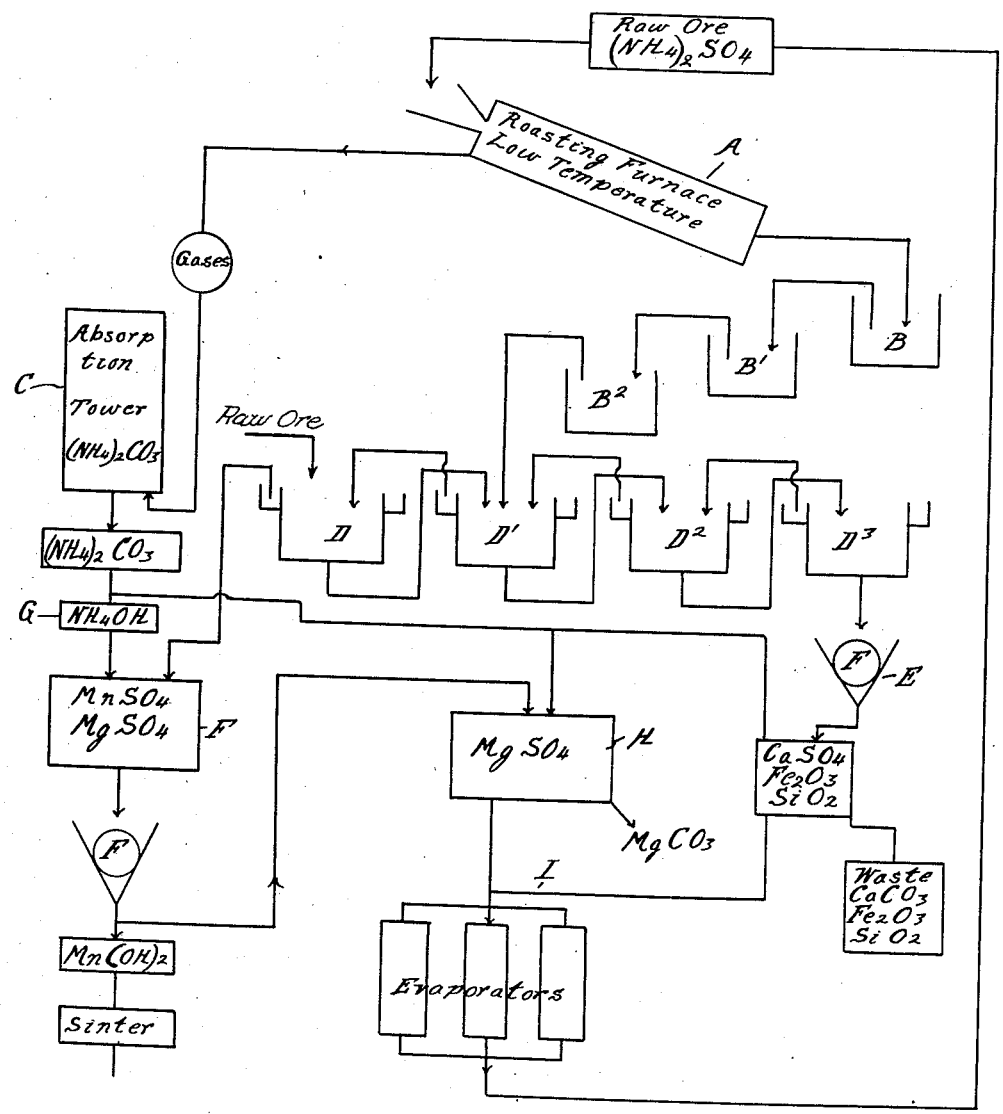

2,176,775

UNITED STATES PATENT OFFICE 2,176,775

PROCESS OF EXTRACTING METALS FROM ORES

Andrew T. Sweet, Houghton, and John D. MacCarthy, Detroit, Mich., assignors to General Manganese Corporation, Detroit, Mich., a corporation of Delaware Application September 23, 1929, Serial No. 394,676
Renewed January 11, 1934

29 Claims. (Cl. 23—145)

The invention relates to the extraction of metals from ores and has for its object the obtaining of a process applicable to the economical treatment of relatively low grade ores containing various metals in the form of oxides, carbonates or other insoluble compounds. The invention consists in the novel method of converting these insoluble compounds into soluble compounds, thereby permitting of separation from the gangue by leaching. The invention further consists in various features of the process as hereinafter set forth.

While our improved process is applicable to the treatment of various ores containing different metals and in different chemical compounds, we will specifically describe its application to the treatment of a manganese ore such as one of the following analysis:

|  | | Per cent |
|---|---|---|
| Dried 212° | Mn | 16.00 |
| | Fe | 11.00 |
| | P | .429 |
| | $SiO_2$ | 13.00 |
| | MgO | 1.80 |
| | CaO | 15.00 |
| | $Al_2O_2$ | 2.70 |
| | $CO_2$ loss | 26.00 |

Essentially our improved process consists in roasting the ore with a reagent having a gaseous base such as ammonium salts. During such roasting a chemical reaction takes place in which the gaseous base or ammonia is liberated and the acid radical of the reagent combines with the various metals to form soluble compounds. Thus with the specific ore above mentioned the metallic compounds are originally in the form of carbonates and during the reaction accompanying the roasting process the carbon dioxide will be displaced passing off with the ammonia or other gaseous base and combining therewith to form a new chemical compound. This compound or derivatives thereof may be subsequently used for precipitating the metals from their soluble compounds, these having been first separated from the gangue by leaching.

The accompanying drawing diagrammatically represents a flow sheet in the carrying out of our specific process, which process is as follows:

The wet or dry, preferably wet, mixture of ammonium sulphate and ore is charged into the roasting furnace. When sufficiently heated so that the moisture begins to form steam the chemical reaction is started. There is first discharged ammonia gas followed by a mixture of ammonia and carbon dioxide fumes which at cooler temperatures unite to form ammonium carbonate. At the same time the acid radical which has displaced carbon dioxide united with the metal bases to form sulphates. Thus with ore of the specific analysis above given there will be formed iron sulphate $FeSO_4$, manganese sulphate $MnSO_4$, magnesium sulphate $MgSO_4$ and calcium sulphate $CaSO_4$. By carefully controlling the temperature any iron sulphate which is formed will be again decomposed into iron oxide with the liberation of the acid radical which unites with the other bases.

Referring to the flow sheet, A represents the roasting furnace in which the above described reaction takes place. The material discharged from the furnace passes to agitators B, B', B² where it is commingled with water and the soluble salts leached out. The gases from the furnace are passed to an absorption tower C where the ammonia and carbon dioxide unite to form ammonium carbonate $(NH_4)_2CO_3$.

From the agitators B, B', B² the material passes to the separators D, D', D², D³ in which the solids are passed through the series in one direction and to the filter E, while the liquid is passed in the opposite direction to the tank F. In case there is any iron sulphate in the solution this may be eliminated by the introduction of a sufficient quantity of raw ore, the acid radical attacking other metal carbonates to form additional manganese sulphate, magnesium sulphate and calcium sulphate with the precipitation of the iron. The pregnant liquor which passes to the tank F is then treated by ammonium hydroxide which is derived from a portion of the ammonium carbonate in the tank G. This results in precipitating the manganese while leaving the magnesium sulphate still in solution. The latter is passed to H where it is treated with ammonium carbonate precipitating the magnesium. The several precipitations also result in the formation of ammonium sulphate and the solution containing this material is conducted to evaporators I where the original reagent is recovered and may be used again in the roasting furnace.

To recover the sulphuric acid combining with calcium the gangue may be treated with some of the ammonium carbonate which will form calcium carbonate and ammonium sulphate which latter will be returned with the reagent formed by the several precipitations.

While the above procedure is preferable in treating the ores specifically used for an example of the process, it is obvious that the ammonia and carbon-dioxide gases from the roasting furnace may be used as desired for the precipitation of the metal compounds in the tank F as disclosed in our copending application of even date, Ser. No. 394,677. Thus, it is obvious that ammonium carbonate may be used directly for precipitating the desired metal compounds from the pregnant liquor in the tank F thereby regenerating the ammonium sulphate. It should also be noted that in treating oxide ores previously referred to in the specification, it is obvious that no carbon-dioxide gases are evolved, but only ammonia gases which would form ammonium hydroxide in the absorption tower and would be used directly for the precipitation of the manganese compound from the soluble manganese sulphate, thereby reforming the ammonium sulphate.

What we claim as our invention is:

1. The process of recovering metal compounds from carbonate ores which consists in roasting the ores with a reagent having an ammonium base to convert one or more of the carbonates into soluble compounds with the evolution of carbon dioxide and ammonia gases, collecting and combining the said gases to form a compound, leaching the soluble compounds from the insoluble constituents of the ore, precipitating the desired metal or metals from the solution by a derivative of the said gases and separating the solution therefrom, precipitating one or more remaining metals from the solution, said precipitations resulting in the reforming of the original reagent and separating and evaporating the same to the original state in order to repeat the cycle.

2. The process of recovering metal compounds from carbonate ores which consists in roasting the ore with ammonium sulphate to convert one or more of the carbonates into soluble sulphates with the liberation of carbon dioxide and ammonia gas, collecting and combining said gases to form ammonium carbonate, leaching the roasted ore to separate the soluble sulphates from the insoluble constituents, treating a portion of the ammonium carbonate to obtain a derivative therefrom, precipitating one or more of the sulphates from the solution by the said derivative and separating the solution therefrom, precipitating one or more remaining sulphates from the solution by the ammonium carbonate and separating and evaporating the ammonium sulphate resulting from the several precipitations to the original state in order to repeat the cycle.

3. The process of recovering manganese and mangesium compounds from carbonate ores containing the same which consists in roasting the ore with ammonium sulphate to convert the carbonates into soluble sulphates with the liberation of carbon dioxide and ammonia gas, collecting and combining said gases to form ammonium carbonate, leaching the roasted ore to separate the soluble sulphates from the insoluble constituents, treating a portion of the ammonium carbonate to obtain ammonium hydroxide therefrom, precipitating manganese hydroxide from the solution by said ammonium hydroxide and separating the solution therefrom, precipitating an insoluble magnesium compound from said solution by the ammonium carbonate and separating and evaporating the ammonium sulphate resulting from both of said precipitations to the original state in order to repeat the cycle.

4. The process of recovering manganese and magnesium compounds from carbonate ores containing the same which comprises roasting the ore with ammonium sulphate to form soluble sulphates of manganese and magnesium and resulting in the evolution of ammonia and carbon dioxide gases, separating the soluble sulphates from the insoluble residue, precipitating insoluble manganese and magnesium compounds with an ammonium compound derived from said gases, thereby reforming the ammonium sulphate and separating and evaporating the ammonium sulphate to the original state in order to repeat the cycle.

5. The process of recovering manganese compounds from ores containing manganese carbonates which comprises roasting the ore with ammonium sulphate to form soluble manganese sulphate, resulting in the evolution of ammonia and carbon dioxide gases, separating the soluble manganese sulphate from the insoluble residue, precipitating a manganese compound with a derivative of the said gases capable of forming an insoluble manganese compound and reforming the ammonium sulphate and separating and evaporating the ammonium sulphate to the original state in order to repeat the cycle.

6. The process of recovering manganese compounds from ores of the class comprising oxides and carbonates of manganese containing appreciable manganese values which comprises roasting the ores with ammonium sulphate to form manganese sulphate and resulting in the evolution of gases comprising ammonia, separating the soluble manganese sulphate from the insoluble residue, reacting said solution of manganese sulphate with an ammonium compound derived from said gases evolved from said roast, thereby precipitating an insoluble manganese compound and reforming ammonium sulphate, and separating and evaporating said ammonium sulphate to the original state in order to repeat the cycle.

7. The process of recovering manganese compounds from ores containing appreciable amounts of manganese oxides which comprises roasting the ores with ammonium sulphate to form soluble manganese sulphate and resulting in the evolution of ammonia gases, separating the soluble manganese sulphate from the insoluble residue, precipitating insoluble manganese hydroxide with an ammonium compound derived from said ammonia gases, thereby reforming the said ammonium sulphate, and separating and evaporating the same to the original state in order to repeat the cycle.

8. The process of recovering manganese compounds from carbonate ores containing manganese, iron and insoluble compounds which comprises roasting the ore with ammonium sulphate to form soluble sulphates of manganese and iron and resulting in the evolution of ammonia and carbon dioxide gases, controlling the temperature in the furnace to decompose the soluble iron compound into the insoluble iron oxide, separating the soluble manganese sulphate from the insoluble residue, precipitating an insoluble manganese compound with an ammonium compound derived from said gases, thereby reforming the said ammonium sulphate and separating and evaporating the same to the original state in order to repeat the cycle.

9. The process of recovering metal compounds from ores containing magnesium carbonate, manganese and iron compounds and insoluble compounds of the class consisting of phosphates, silicates and alumina which comprises roasting the ore with ammonium sulphate to form the soluble sulphates of manganese, iron and magnesium and resulting in the evolution of ammonia and carbon dioxide gases, controlling the temperature of the furnace to decompose the soluble iron compound and to form insoluble iron oxide, separating the soluble manganese and magnesium sulphates from the insoluble residue, precipitating insoluble manganese hydroxide with ammonium hydroxide derived from the said gases, thereby reforming ammonium sulphate, separating and treating the remaining soluble sulphates of magnesium and ammonium with the reaction product of said ammonia and carbon dioxide gases to precipitate insoluble magnesium carbonate and to reform the ammonium sulphate and separating and evaporating the ammonium sulphate resulting from the several precipitations to the original state in order to repeat the cycle.

10. The process of recovering metal compounds from ores containing manganese, magnesium and calcium carbonates, iron compounds and insoluble compounds of the class consisting of phosphates, silicates and alumina which comprises roasting the ore with ammonium sulphate to form the soluble sulphates of manganese, iron and magnesium, resulting in the evolution of ammonia and carbon dioxide gases, controlling the temperature in the furnace to decompose the soluble iron compound into the insoluble oxide, separating the soluble sulphates of manganese and magnesium from the insoluble residue, precipitating manganese hydroxide with ammonium hydroxide derived from the said gases, treating the remaining solution with the reaction product of said ammonia and carbon dioxide gases to precipitate magnesium carbonate, treating the insoluble calcium sulphate in the first residue with ammonium carbonate to precipitate calcium carbonate, collecting the ammonium sulphate thereby reformed from the several precipitations and separating and evaporating the same to the original state in order to repeat the cycle.

11. The process of recovering metal compounds from ores containing manganese, magnesium and calcium carbonates, iron compounds and insoluble compounds of the class consisting of phosphates, silicates and alumina which comprises roasting the ore with ammonium sulphate to form the soluble sulphates of manganese, iron and magnesium, resulting in the evolution of ammonia and carbon dioxide gases, separating the soluble sulphates from the insoluble residue, adding manganese carbonate ore to the soluble sulphate solution to precipitate insoluble iron hydroxide and to form additional soluble sulphates of manganese and magnesium, separating the soluble sulphates of manganese and magnesium from the insoluble iron compound, precipitating manganese hydroxide with ammonium hydroxide derived from the said gases, treating the remaining solution with the reaction product of said ammonia and carbon dioxide gases to precipitate insoluble magnesium carbonate, treating the insoluble calcium sulphate in the first residue with ammonium carbonate to precipitate calcium carbonate, collecting the ammonium sulphate thereby reformed from the several precipitations and separating and evaporating the same to the original state in order to repeat the cycle.

12. The process of treating low grade manganese ore for recovery of manganese values therefrom which comprises heating an intimate commixture of such an ore with ammonium sulphate at reacting temperature until most of the manganese content is converted into manganous sulphate, and leaching manganous sulphate from the mixture which has been thus heated.

13. The process of recovering manganese values from ores of the class consisting of oxides and carbonates of manganese containing appreciable manganese values, iron compounds and insoluble compounds which comprises roasting the ore with ammonium sulphate to form manganese sulphate resulting in the evolution of gases comprising ammonia, controlling the roasting temperature to convert the iron compounds into insoluble iron oxide without substantial decomposition of the manganese sulphate, water-leaching the roasted mixture to separate the soluble manganese sulphate from the insoluble residue and precipitating manganese values from the manganese sulphate solution.

14. The process of recovering manganese values from ores of the class consisting of oxides and carbonates of manganese containing appreciable manganese values, iron compounds and insoluble compounds which comprises roasting the ore with ammonium sulphate to form manganese sulphate resulting in the evolution of gases comprising ammonia, controlling the roasting temperature to convert the iron compounds into insoluble iron oxide without substantial decomposition of the manganese sulphate, water-leaching the roasted mixture to separate the soluble manganese sulphate from the insoluble residue, reacting said solution of manganese sulphate with an ammonium compound obtained from said evolved gases thereby reforming ammonium sulphate solution and separating and evaporating said solution to recover ammonium sulphate in the original state in order to repeat the cycle.

15. The process of recovering manganese values from ores containing appreciable amounts of manganese oxides, iron compounds and insoluble compounds which comprises roasting the ore with ammonium sulphate to form soluble manganese sulphate resulting in the evolution of ammonia gases, maintaining the roasting temperature sufficiently high to decompose any iron sulphate to insoluble iron oxide without substantial decomposition of manganese sulphate, water-leaching said roasted mixture to separate the soluble manganese sulphate from the insoluble residue, precipitating insoluble manganese hydroxide with ammonium hydroxide derived from said ammonia gases thereby reforming ammonium sulphate solution and separating and evaporating said solution to recover the ammonium sulphate in the original state in order to repeat the cycle.

16. The process of recovering manganese compounds from ores of the class comprising oxides and carbonates of manganese containing apperciable manganese values which comprises roasting the ores with an ammonium salt capable of forming a soluble manganese compound and resulting in the evolution of gases comprising ammonia, separating the soluble manganese salt from the insoluble residue, reacting said solution of manganese salt with the reaction product of said gases evolved from said roast thereby precipitating an insoluble manganese compound and reforming the said ammonium salt in solution and separating and evaporating said solution to recover the ammonium salt in the original state in order to repeat the cycle.

17. The process of recovering manganese compounds from ores containing appreciable amounts of manganese oxides which comprises roasting the ores with an ammonium salt capable of forming a soluble manganese compound and resulting in the evolution of ammonia gases, separating the soluble manganese salt from the insoluble residue, precipitating insoluble manganese hydroxide with ammonium hydroxide derived from said ammonia gases thereby reforming the said ammonium salt in solution and separating and evaporating said solution to recover the ammonium salt in the original state in order to repeat the cycle.

18. The process of recovering manganese compounds from ores containing appreciable amounts of manganese oxides which comprises roasting the ores with ammonium sulphate to form soluble manganese sulphate and resulting in the evolution of ammonia gases, separating the soluble manganese sulphate from the insoluble residue, precipitating insoluble manganese hydroxide with ammonium hydroxide derived from the said ammonia gases, thereby reforming the said ammonium sulphate, and separating and evaporating the same to the original state in order to repeat the cycle.

19. The process of recovering manganese compounds from ores containing appreciable amounts of manganese oxides which comprises roasting the ores with an ammonium salt capable of forming a soluble manganese compound and resulting in the evolution of ammonia gases, separating the soluble manganese salt from the insoluble residue, precipitating insoluble manganese hydroxide with ammonium hydroxide derived from said ammonia gases thereby reforming the said ammonium salt in solution and separating and evaporating said solution to recover the ammonium salt in the original state in order to repeat the cycle.

20. The process of producing manganeseسlphate from manganese oxide bearing material which comprises heating a solid commixture of such material with ammonium sulphate at reacting temperature until most of the manganese content is converted into manganous sulphate.

21. The process of producing manganese sulphate from manganese oxide bearing material which comprises heating a solid commixture of such material with ammonium sulphate at reacting temperature until most of the manganese content is converted into manganous sulphate, and leaching manganous sulphate from the mixture which has been thus heated.

22. The process of recovering manganese compounds from ores containing appreciable amounts of manganese oxides which comprises roasting the ores with ammonium sulphate to form soluble manganese sulphate and resulting in the evolution of ammonia gases, separating the soluble manganese sulphate from the insoluble residue, precipitating insoluble manganese hydroxide with ammonium hydroxide derived from the said ammonia gases, thereby reforming the said ammonium sulphate in solution, and separating and evaporating said solution to recover the ammonium sulphate in the original state in order to repeat the cycle.

23. The process of producing manganese sulphate from manganiferous material which comprises roasting a finely divided solid commixture of said manganiferous material with sufficient ammonium sulphate to convert the manganese content into manganese sulphate, the roasting being conducted at reacting temperatures.

24. The process of producing manganese sulphate from manganiferous material which comprises roasting a finely divided solid commixture of said material with ammonium sulphate at reacting temperatures.

25. The process of recovering manganese compounds from ores containing manganese carbonates, iron compounds and insoluble compounds which comprises roasting the ore with an ammonium salt capable of forming soluble manganese and iron compounds, resulting in the evolution of ammonia and carbon dioxide gases, controlling the temperature in the furnace to decompose the soluble iron compound into the insoluble oxide, separating the soluble manganese compound from the insoluble residue, precipitating from the solution a manganese compound with an ammonium compound derived from at least one of the said gases capable of forming an insoluble manganese compound and reforming the said ammonium salt in solution and separating and evaporating said solution to recover the ammonium salt in the original state in order to repeat the cycle.

26. The process of recovering manganese compounds from ores containing manganese carbonates, iron compounds and insoluble compounds which comprises roasting the ore with an ammonium salt capable of forming soluble manganese and iron compounds, resulting in the evolution of ammonia and carbon dioxide gases, separating the soluble manganese and iron compounds from the insoluble residue, adding manganese carbonate ore to form insoluble iron hydroxide and additional soluble manganese compounds, separating the soluble manganese compounds from the insoluble iron hydroxide, precipitating a manganese compound from the solution with an ammonium compound derived from at least one of the said gases capable of forming an insoluble manganese compound and reforming the said ammonium salt in solution and separating and evaporating said solution to recover the ammonium salt in the original state in order to repeat the cycle.

27. The process of recovering manganese compounds from ores of the class consisting of manganese carbonates and oxides containing iron compounds and insoluble compounds which comprises roasting the ore with an ammonium salt capable of forming soluble manganese and iron compounds, resulting in the evolution of ammonia gases, controlling the temperature in the furnace to decompose the soluble iron compound into the insoluble oxide, separating the soluble manganese compound from the insoluble residue, precipitating from the solution a manganese compound with an ammonium compound derived from said ammonia gases thereby reforming the said ammonium salt in solution and separating and evaporating said solution to recover the ammonium salt in the original state in order to repeat the cycle.

28. The process of recovering manganese compounds from ores of the class consisting of manganese carbonates and oxides containing iron compounds and insoluble compounds which comprises roasting the ore with an ammonium salt capable of forming soluble manganese and iron compounds, resulting in the evolution of ammonia gases, separating the soluble manganese and iron compounds from the insoluble residue, adding additional manganese ore to form insoluble iron hydroxide and additional soluble manganese compounds, separating the soluble manganese compounds from the insoluble iron hydroxide, precipitating from the solution an insoluble manganese compound with an ammonium compound derived from said ammonia gases thereby reforming the ammonium salt in solution and separating and evaporating said solution to recover the ammonium salt in the original state in order to repeat the cycle.

29. The process of recovering manganese compounds from ores containing manganese carbonates which comprises roasting the ore with an ammonium salt capable of forming a soluble manganese compound, resulting in the evolution of ammonia and carbon dioxide gases, separating the soluble manganese compound from the insoluble residue, precipitating from the solution an insoluble manganese compound, separating said insoluble manganese compound from the remaining soluble compounds, treating said remaining soluble compounds with ammonium carbonate derived from said ammonia and carbon dioxide gases thereby reforming the said ammonium salt in solution and separating and evaporating said solution to recover the ammonium salt in the original state in order to repeat the cycle.

ANDREW T. SWEET.
JOHN D. MacCARTHY.